United States Patent [19]
Blaker et al.

[11] Patent Number: 5,724,390
[45] Date of Patent: Mar. 3, 1998

[54] MLSE BEFORE DEROTATION AND AFTER DEROTATION

[75] Inventors: David Mark Blaker, Emmaus; Marc Stephen Diamondstein, Allentown, both of Pa.; Gregory Stephen Ellard, Binfield, United Kingdom; Mohammad Shafiul Mobin, Whitehall, Pa.

[73] Assignee: Lucent Technologies Inc., Murray Hill, N.J.

[21] Appl. No.: 205,962

[22] Filed: Mar. 2, 1994

[51] Int. Cl.$^6$ ............................................... H03H 7/30
[52] U.S. Cl. ...................... 375/229; 375/232; 364/724.2; 333/28 R
[58] Field of Search ...................... 375/11, 12, 13, 375/14; 364/724.19, 724.2, 724.16; 333/18, 28 R; 371/43

[56] References Cited

U.S. PATENT DOCUMENTS

| | | | |
|---|---|---|---|
| 4,021,738 | 5/1977 | Gitlin et al. | 325/323 |
| 4,748,626 | 5/1988 | Wong | 371/30 |
| 5,091,918 | 2/1992 | Wales | 375/11 |
| 5,185,764 | 2/1993 | Baier | 375/231 |
| 5,199,047 | 3/1993 | Koch | 375/231 |
| 5,202,903 | 4/1993 | Okanoue | 375/343 |
| 5,263,026 | 11/1993 | Parr et al. | 375/94 |
| 5,303,263 | 4/1994 | Shoji et al. | 375/229 |
| 5,444,721 | 8/1995 | Okanoue et al. | 375/229 |

FOREIGN PATENT DOCUMENTS

| 241422 | 2/1995 | WIPO | H04L 27/01 |
|---|---|---|---|

OTHER PUBLICATIONS

Proceedings of EUSIPCO-90 Fifth European Signal Processing Conference Barcelona (ES) Sep. 18-21, 1990, Amsterdam (NL), pp. 1799-1802, A. Baier, "Derotation Techniques in Receivers for MSK-Type CPM Signals".

Proceedings of 37th IEEE Vehicular Technology Conference, Tampa, Florida, Jun. 1-3, 1987, New York (US), pp.385-392, R. D'Avella, et al., "Adaptive Equalization in TDMA Mobile Radio Systems".

IEEE Transactions on Vehicular Communications, vol. 41, No. 2, May 1992 New York, US, pp. 177-189, XP 000307100, G. D'Aria et al., "Simulation and Performance of the Pan-European Land Mobile Radio System".

Proceedings of Second IEEE National Conference on Telecommunications York (UK), Apr. 2-5, 1989, London (UK), pp. 61-66, XP 000130111, L. B. Lopes, "Performance of Viterbi Equalisers for the GSM System".

Del Re, E. et al, Design of a Digital MLSE Receiver for Mobile Radio Communications (1991) IEEE GLOBECOM '91.

*Primary Examiner*—Melvin Marcelo
*Assistant Examiner*—Conguan Tran
*Attorney, Agent, or Firm*—David L. Smith

[57] ABSTRACT

There is an equalizer or a receiver including an equalizer which has means to factor detected symbols transmitted over a transmission channel into a magnitude portion and a repetitive phase portion. The receiver further has means to generate modified tap weights by multiplying the repetitive phase portion by tap weights representative of the channel. Modified tap weights are generated by multiplying the repetitive phase portion by tap weights representative of the channel. The modified tap weights are convolved with bits of possible states to generate possible transmitted symbols. A maximum likelihood sequence estimation is performed on the possible transmitted symbols comparing each possible transmitted symbol to a received symbol to generate an MLSE detected symbol. The detected symbol is multiplied by a rotating vector to generate a decoded symbol. In an alternate embodiment, a received symbol from the sequence of received symbols is multiplied by a rotating vector prior to performing the maximum likelihood sequence estimation.

20 Claims, 6 Drawing Sheets

MLSE BEFORE DEROTATION AND AFTER DEROTATION

TECHNICAL FIELD

This invention relates generally to communication systems and more particularly to digital communication systems incorporating an equalizer such as a cellular communication system incorporating a maximum likelihood sequence estimator equalizer.

BACKGROUND OF THE INVENTION

A cellular communication system is one type of radio communication system in which radio telephones contain circuitry to permit transmission and reception of modulated signals, thereby permitting two-way communication between the radio telephones and remotely located transceivers, known as base stations. Several techniques have been developed to reduce the bit error rate of digital communications between a mobile transceiver and a base station. One technique includes redundant information in encoded transmitted data for use in error correction in the decoding process. An exemplary error correction scheme uses the Viterbi algorithm. The Viterbi algorithm is a maximum likelihood decoding scheme that provides forward error correction. Each state is represented by a plurality of bits. A limited number of transitions are possible from a state at one symbol instant to a state at a subsequent symbol instant. Correspondingly, each state at a subsequent symbol instant has only a limited number of possible previous individual states from which a transition to it can originate. The Viterbi algorithm calculates all of the possible states at a subsequent symbol instant, along with an associated metric, and performs a maximum likelihood sequence estimation (MLSE) on each possible state. In the MLSE process, each possible state is compared to a received symbol in an equalizer utilizing a convolution process. Thus, many possible received states are compared to each received symbol. Receivers have typically used equalizers that had to multiply two complex quantities in the convolution process. As is well known, the circuitry needed to multiply complex quantities is more complicated than is the circuitry required to multiply real numbers or a complex number by a real number.

The receiver circuitry could be simplified by the use of a convolution process that did not require the multiplication of two complex quantities.

SUMMARY OF THE INVENTION

In accordance with one embodiment of the invention, a receiver has means to factor detected symbols transmitted over a transmission channel into a real portion and an imaginary portion. The receiver further has means to generate modified tap weights by multiplying the imaginary portion by tap weights representative of the channel. The modified tap weights are convolved with bits of possible states to generate possible transmitted symbols. A maximum likelihood sequence estimation (MLSE) is performed on the possible transmitted symbols by comparing each possible transmitted symbol to a received symbol to generate an MLSE detected symbol. The detected symbol is multiplied by a rotating vector to generate a decoded symbol. In an alternate embodiment, a received symbol from the sequence of received symbols is multiplied by a rotating vector prior to performing the maximum likelihood sequence estimation.

DETAILED DESCRIPTION

Figure 1:
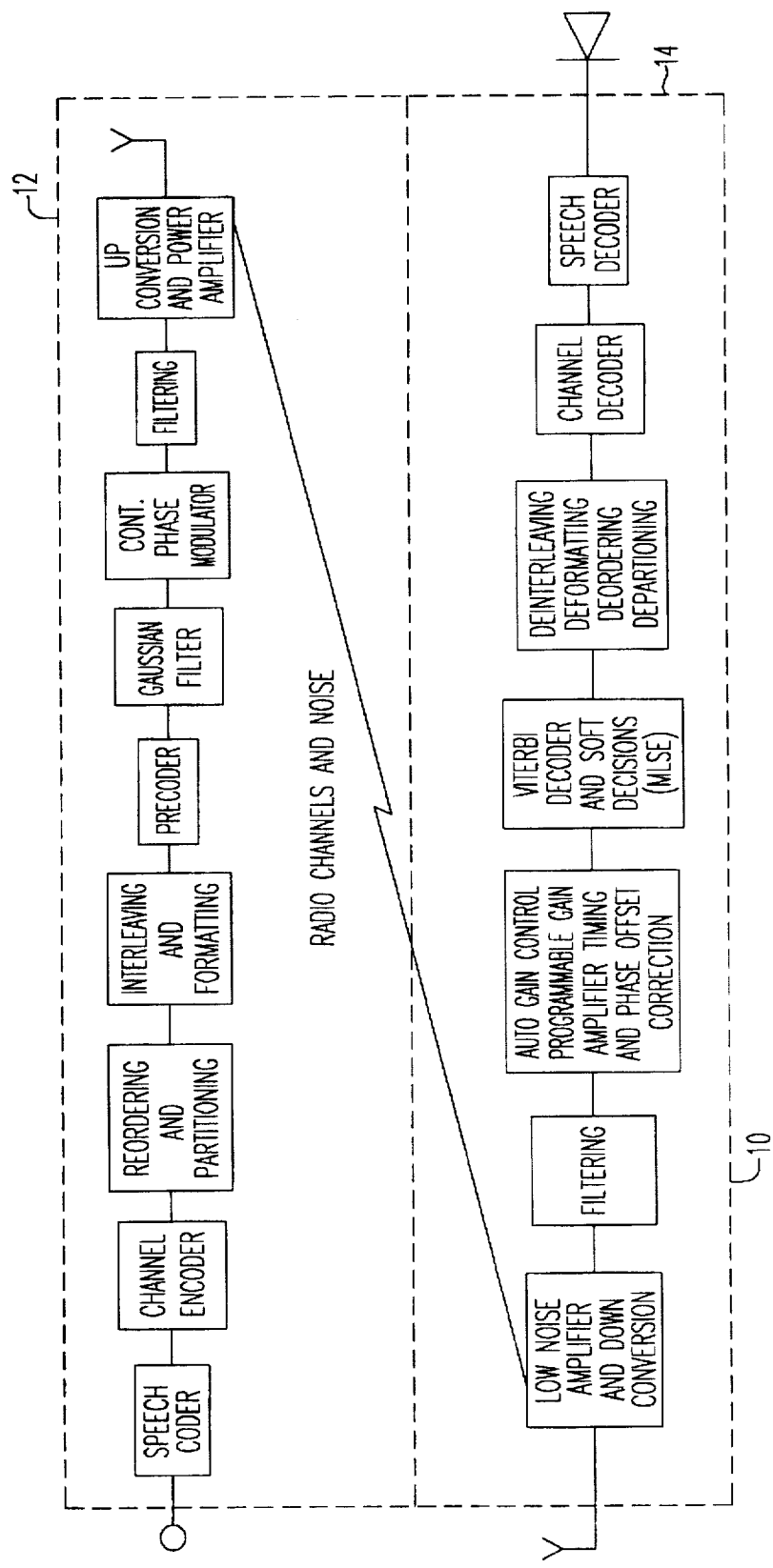
FIG. 1 is a block diagram of a transceiver.

Transceiver 10, shown in the block of diagram of FIG. 1, is a communication system or portion of a communication system such as a mobile digital cellular telephone. Transceiver 10 is comprised of transmitter 12 and receiver 14.

Figure 2:
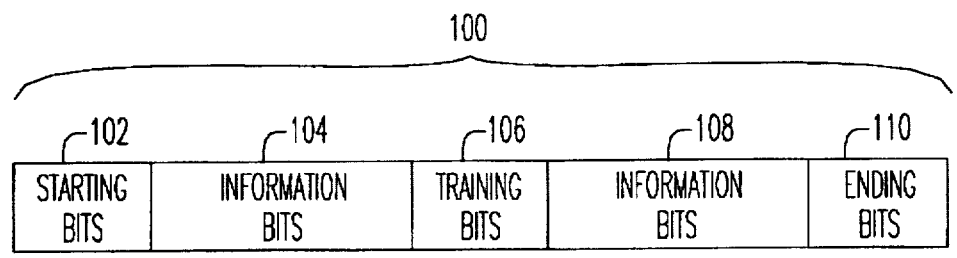
FIG. 2 is an illustration showing the structure of bits in an exemplary transmission burst.
Figure 7:
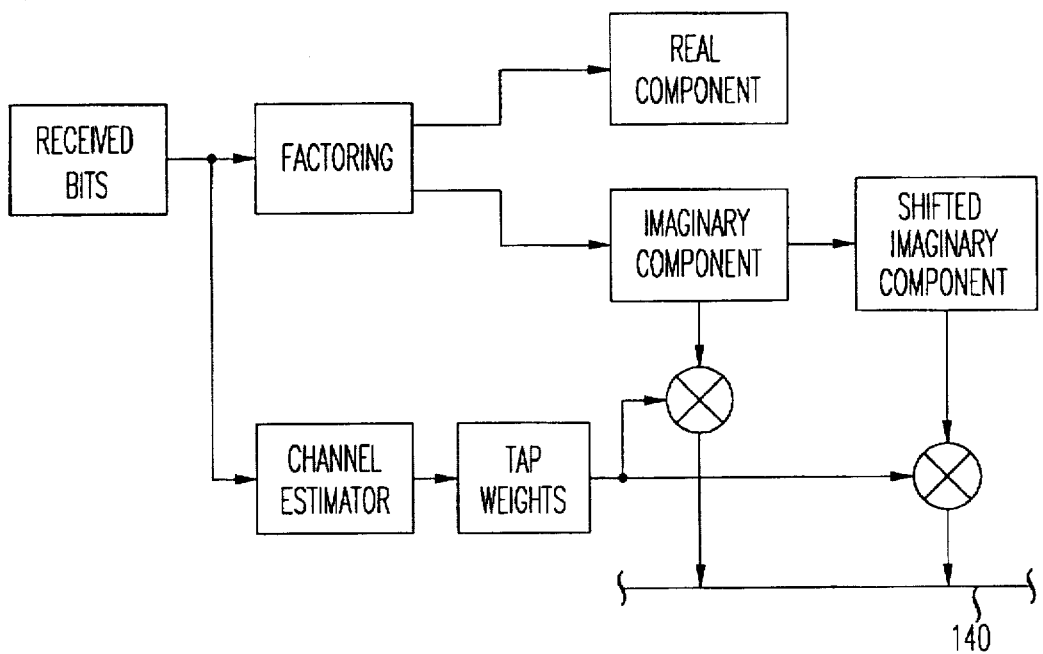
FIG. 7 is a block diagram showing calculation of the modified tap weights.

An exemplary frame, or transmission burst 100, of information transmitted, typically by a base station or mobile digital cellular telephone to the other, is shown in FIG. 2. The frame contains a predetermined number of bits. Each frame includes starting bits 102, a first set of information bits 104, training bits 106, a second set of information bits 108 and ending bits 110. Training bits 106 located between information bits 104 and information bits 108 are also referred to as mid-amble bits. Typically there are three starting and ending bits, 58 bits in each set of information bits, and 26 training bits for a total of 148 bits per frame. The training bits are known. The starting and ending bits are known and typically are zeros. Other numbers and distribution of bits are possible depending on the implementation.

The training bits in a received burst are used to calculate an estimate of the channel over which the transmission occurred. The channel estimate is the impulse response function of the channel. An interference free signal is transmitted. However, the received signal is distorted due to noise and interference. By cross-correlating received training bits with a reference sequence of bits, an estimate of the channel is obtained. Each term in the impulse function is a complex quantity and is known as a tap weight or channel tap. Each tap weight represents the effects of channel distortion on the transmitted signal. The number of tap weights will vary, depending on the delay spread, from two to C−1, where C is the constraint length for the particular implementation. Typically the constraint length will range from two to about six.

Table 1 contains data that will be used to explain an exemplary embodiment of the invention. This data assumes no initial phase offset.

TABLE 1

| i | 0 | 1 | 2 | 3 | 4 | 5 | 6 | 7 | 8 | 9 | 10 | 11 | 12 | 13 |
|---|---|---|---|---|---|---|---|---|---|---|----|----|----|----|
| a(i) | 0 | 0 | 0 | 1 | 0 | 1 | 1 | 0 | 0 | 0 | 1 | 0 | 0 | 0 |
| $d(i) = a(i) \oplus a(i-1)$ | 1 | 0 | 0 | 1 | 1 | 1 | 0 | 1 | 0 | 0 | 1 | 1 | 0 | 0 |
| $\alpha(i) = 1 - 2d(i)$ | -1 | 1 | 1 | -1 | -1 | -1 | 1 | -1 | 1 | 1 | -1 | -1 | 1 | 1 |
| $\exp(j(t) = \Sigma \alpha(i)\pi/2T)$ | -j | 1 | j | 1 | -j | -1 | -j | -1 | -j | 1 | -j | -1 | -j | 1 |
| I, Q → {+1,-1} | -1 | 1 | 1 | 1 | -1 | -1 | -1 | -1 | -1 | 1 | -1 | -1 | -1 | 1 |
| Phase of I, Q = {1,j} | j | 1 | j | 1 | j | 1 | j | 1 | j | 1 | j | 1 | j | 1 |
| MLSE detected symbol | -j | 1 | j | 1 | -j | -1 | -j | -1 | -j | 1 | -j | -1 | -j | 1 |
| $\theta = e^{[-j\pi(i+1)/2T]}$ | -j | -1 | j | 1 | -j | -1 | j | 1 | -j | -1 | j | 1 | -j | 1 |
| output = $\theta^* \psi(t)$ | -1 | -1 | -1 | 1 | -1 | 1 | 1 | -1 | -1 | -1 | 1 | -1 | -1 | -1 |
| a'(i) | 0 | 0 | 0 | 1 | 0 | 1 | 1 | 0 | 0 | 0 | 1 | 0 | 0 | 0 |

In Table 1, i represents symbol instants of time. a(i) represents the binary signal to be transmitted during each symbol instant. d(i) represents an exclusive OR (XOR) of the binary signal in symbol instant i with the binary signal from the previous symbol instant, i−1. The sequence of bits, d(i), are converted to a non return-to-zero(NRZ) representation resulting in a(i) which are ±1 signals. $e^{j(t)}$ is the minimum shift keying (MSK) modulated signal, which alternates from real to imaginary, as transmitted by a transmitter 12 or a base station transmitter and, absent noise or interference, received by a receiver 14 or a base station receiver. $e^{j(t)}$, is represented as sampled at each symbol instant, where T is the time period between adjacent symbol instants. MSK modulation, a modulation scheme in which signal information is converted into phase information, is preferred although other modulation schemes are possible. If gaussian minimum shift keying (GMSK) modulation is employed, gaussian filtering is performed on the transmitted bits. The modulated signal is factored into a real component shown in row 6 of Table 1 and an imaginary component shown in row 7. The real component includes the sign while the imaginary component alternates between the positive real axis and the positive imaginary axis. The additional rows of Table 1 will be explained as required.

The exemplary received signal is represented by row 5 of Table 1 and is further processed after being received by a receiver. The MSK modulated signal is factored for ease of implementation. It is known that the imaginary component of the factored signal is alternatively j and 1. Thus, the product of rows 6 and 7, at each symbol instant, is the received signal shown in row 5.

Factoring the received signal into real and imaginary components is better understood with reference to equations (1) and (2).

$$\begin{bmatrix} -j & -1 & -j \\ -j & -1 & j \\ -j & 1 & -j \\ -j & 1 & j \\ j & -1 & -j \\ j & -1 & j \\ j & 1 & -j \\ j & 1 & j \end{bmatrix} = \begin{bmatrix} -1 & -1 & -1 \\ -1 & -1 & 1 \\ -1 & 1 & -1 \\ -1 & 1 & 1 \\ 1 & -1 & -1 \\ 1 & -1 & 1 \\ 1 & 1 & -1 \\ 1 & 1 & 1 \end{bmatrix} \begin{bmatrix} j & o & o \\ o & 1 & o \\ o & o & j \end{bmatrix} \quad (1)$$

$$\begin{bmatrix} -1 & -j & -1 \\ -1 & -j & 1 \\ -1 & j & -1 \\ -1 & j & 1 \\ 1 & -j & -1 \\ 1 & -j & 1 \\ 1 & j & -1 \\ 1 & j & 1 \end{bmatrix} = \begin{bmatrix} -1 & -1 & -1 \\ -1 & -1 & 1 \\ -1 & 1 & -1 \\ -1 & 1 & 1 \\ 1 & -1 & -1 \\ 1 & -1 & 1 \\ 1 & 1 & -1 \\ 1 & 1 & 1 \end{bmatrix} \begin{bmatrix} 1 & o & o \\ o & j & o \\ o & o & 1 \end{bmatrix} \quad (2)$$

The left side of equation (1) shows the complex Viterbi states, for a constraint length of 4, that would be convolved with channel taps at alternate symbols instants whereas the left side of equation (2) shows the complex Viterbi states that would be convolved with channel taps at the other symbol instants.

As can be seen on the right side of equations (1) and (2) the complex Viterbi states can be factored into a real component and an imaginary component. The right side of equations (1) and (2) show a product of a state counter (such as a NRZ state counter) and a diagonal matrix. The state counter is thus simplified and is the same for both sets of symbol instants. This also simplifies the metric calculator. Further simplification in circuitry can be made by multiplying the tap weights times the diagonal vector to produce modified tap weights for use in a convolution process as described below with respect to FIGS. 3–6.

Figure 3:
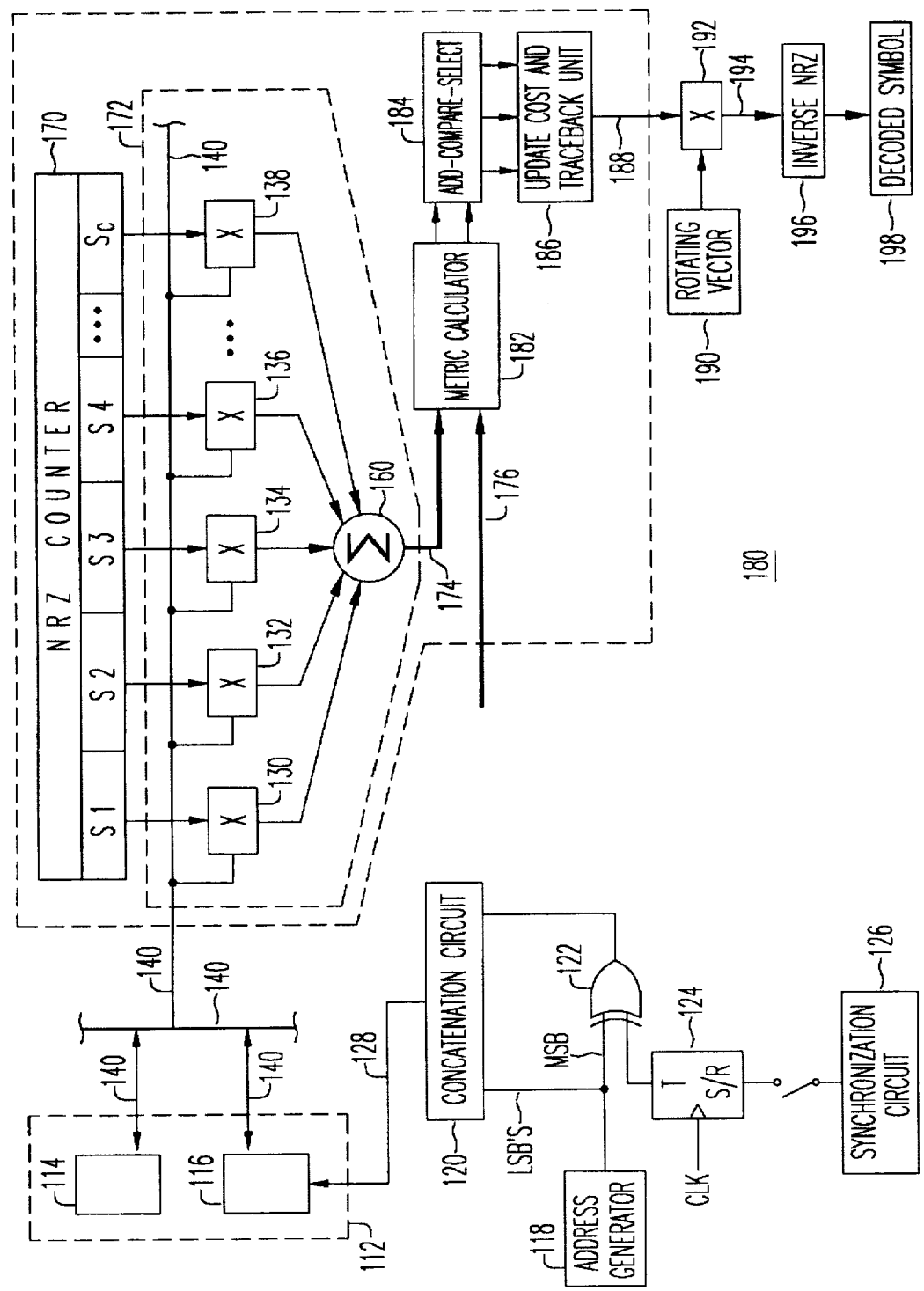
FIG. 3 is a simplified schematic diagram of an illustrative embodiment of the present invention.

FIG. 3 is a simplified schematic diagram of a portion of receiver 14 shown in FIG. 1. In the maximum likelihood sequence estimation process, the tap weights, which are complex quantities, are convolved with all possible combinations of Viterbi states. The Viterbi states represent all possible next states in the transmission. The convolution is achieved by convolving all $2^C$ possible states, representing a Viterbi state, to obtain an estimate of the received signal for each candidate state that is employed in the branch metric calculations.

Portions of the registers of random access memory (RAM) 112 form first and second arrays 114 and 116. The number of registers allocated to each array 114 and 116 is typically two raised to a power to accommodate the number of channel taps, recognizing that the channel taps have real and imaginary components. The C tap weights $h_0, h_1, \ldots h_{C-1}$, as obtained from the midamble bits or other method, or updated therefrom, are multiplied by the imaginary component j1j1j ... The resulting products $h_{01}', h_{12}', \ldots h_{(C-1)1}$, which are modified tap weights, are stored in array 114.

The modified tap weights for six taps are shown in Table 2. For each modified tap weight, a real and imaginary component are shown. The symbol * designates multiplication.

TABLE 2

| | | | | | |
|---|---|---|---|---|---|
| $h_{01}'$ | j | * | $h_0(I)$ | j | * | $h_0(Q)$ |
| $h_{11}'$ | 1 | * | $h_1(I)$ | 1 | * | $h_1(Q)$ |
| $h_{21}'$ | j | * | $h_2(I)$ | j | * | $h_2(Q)$ |
| $h_{31}'$ | 1 | * | $h_3(I)$ | 1 | * | $h_3(Q)$ |
| $h_{41}'$ | j | * | $h_4(I)$ | j | * | $h_4(Q)$ |
| $h_{51}'$ | 1 | * | $h_5(I)$ | 1 | * | $h_5(Q)$ |

The C tap weights are also multiplied by the imaginary component, shifted by one symbol instant, 1j1j1 ... and the products, $h_{02}'$, $h_{12}'$, ... $h_{(c-1)2}'$, which are also modified tap weights, are stored in second array 116. These modified tap weights, for 6 taps, are shown in Table 3.

TABLE 3

| | | | | | |
|---|---|---|---|---|---|
| $h_{02}'$ | 1 | * | $h_0(I)$ | 1 | * | $h_0(Q)$ |
| $h_{12}'$ | j | * | $h_1(I)$ | j | * | $h_1(Q)$ |
| $h_{22}'$ | 1 | * | $h_2(I)$ | 1 | * | $h_2(Q)$ |
| $h_{32}'$ | j | * | $h_3(I)$ | j | * | $h_3(Q)$ |
| $h_{42}'$ | 1 | * | $h_4(I)$ | 1 | * | $h_4(Q)$ |
| $h_{52}'$ | j | * | $h_5(I)$ | j | * | $h_5(Q)$ |

The modified tap weights are used in further signal processing, thereby reducing the complexity of circuitry required, as discussed below, to complete the subsequent signal processing. One array of modified tap weights is generated for each unique symbol in the imaginary component until repetition occurs. Since the imaginary component is repetitive after two symbol instants, only two arrays of modified tap weights are necessary to represent the exemplary embodiment.

The modified tap weights are convolved with all possible Viterbi state combinations in a Viterbi decoding process, such as from −1−1−1−1−1 (NRZ) through 11111 (NRZ), corresponding to 00000 through 11111 binary. Address generator 118 generates an address of array 114 or 116 from which to retrieve a modified tap weight. The least significant bits of the address are provided to concatenation circuit 120. The most significant bit is provided as a first input to XOR122. The second input to XOR122 is provided by the output of toggle flip-flop 124. The state of toggle flip-flop 124 is initially set by synchronization circuit 126 to synchronize the state of flip-flop 124 with the phase state of the received midamble bits. Thereafter, flip-flop 124 toggles each update cycle in the Viterbi process. The output bit from XOR122 is concatenated with the least significant bits from address generator 118 to form an address. The output bit from XOR122 provides the most significant bit of the address. The address so generated is provided to RAM112 on address bus 128. The modified tap weight stored in RAM112 at the concatenated address, both real and imaginary components, is read, then written to one of multipliers 130–138 by way of dam bus 140.

Toggle flip-flop 124 alternating in state results in the modified tap weights being alternately read from array 114 or array 116, on alternating update cycles, depending on the state of flip-flop 124. For example, when the output of flip-flop 124 is zero, the modified tap weights will be read from array 114. Alternately, when the output of flip-flop 124 is one, the modified tap weights will be read from array 116. While this method of addressing has been described for the process of reading modified tap weights from RAM112, it will be appreciated that the same method of addressing RAM 112 can be employed to write the modified tap weights to arrays 114 and 116.

Assume that the output of flip-flop 124 is zero and the modified tap weights are being read from array 114 of RAM 112. Addresses are sequentially generated to read, one at a time, the modified tap weights stored in array 114. The modified tap weight stored in the first register of array 114 is read then written to multiplier 130 as its multiplicand. The modified tap weight stored in the second register of array 114 is addressed, read and written to multiplier 132 as its multiplicand. This process continues through the modified tap weights stored in array 114 and through multiplier 138. Typically, the number of modified tap weights stored in array 114, as well as the number of complex multipliers, is equal to the constraint length C.

The multiplier of each multiplier 130–138 is provided by NRZ counter 170. NRZ counter 170 steps through each of the $2^C$ possible Viterbi states from the equivalent of binary state 00000 (−1−1−1−1−1 NRZ) to 11111 (11111 NRZ). NRZ counter 170 is thus a Viterbi state counter. As can be seen, the output of each stage, S1 through Sc, of NRZ counter 170 is a plus one or minus one. The output from each stage of NRZ counter 170 represents a bit of the possible Viterbi state output by counter 170. The output of each multiplier 130–138 is coupled as an input to summing junction 160. Multipliers 130–138, and summing junction 160 collectively form convolver 172.

In multiplier 130 of convolver 172, the first modified tap weight from array 114 is multiplied times the output from stage S1, which is a scaler quantity. The modified tap weight is a complex quantity, $j*h_0(I)$ and $j*h_0(Q)$. This results in a complex product, output from multiplier 130, being provided to summing junction 160. Simultaneously, the output from stage S2 is multiplied times $1*h_1(I)$ and $1*h_1(Q)$, the output from stage S3 is multiplied times $j*h_2(I)$ and $j*h_2(Q)$, and so forth. Since the outputs from NRZ counter 170 are either plus or minus one the multiplication reduces to addition and subtraction depending on the sign of the output of each stage of NRZ counter 170. In accordance with the present invention, multipliers 130–138 are simpler in construction than multipliers would be if the tap weights were multiplied by complex Viterbi states. Thus each of multipliers 130–138 may be implemented as an accumulator since the output of each stage of NRZ counter 170 will be a plus or minus one.

To multiply complex tap weights times complex Viterbi states would require a complex multiplier. This aspect of the signal processing is simplified by factoring the received signal into a real component and an imaginary component. The imaginary component is combined with the tap weights, which are already complex quantities, to produce (as described above) the modified tap weights which are also complex quantities. The significance of the simplification introduced by the present invention is better appreciated when it is recognized that each update cycle in the Viterbi decoding process the modified tap weights are calculated once, with each modified tap weight multiplied by a bit of a Viterbi state (or NRZ representation thereof) in convolver 172 occurring $2^C$ times. These $2^C$ multiplications, as stated above, are scalar multiplications that reduce to addition and subtraction depending on the sign of each stage of output of counter 170.

Summing junction 160 provides as its output, which is also the output of convolver 172, the sum of the signals output from multipliers 130–138. The output signal 174 from convolver 172 is an estimate of the received signal. The estimate of the received signal and the received signal 176 are provided as inputs to the metric calculator 182 of the Viterbi decoder 180. The output signal 174 provides one input to the metric calculator 182 of the Viterbi decoder. The received signal 176 provides another input to the metric calculator 182. Branch metrics are calculated for all possible states of the counter 170. Accumulated costs and traceback random access memory are updated for executing a traceback operation to obtain an MLSE detected symbol 188.

After branch metrics are evaluated and stored for output signal 174 for each possible state of NRZ counter 170 in a symbol instant, flip-flop 124 toggles and the modified tap weights stored in the registers of array 116 are read from RAM112 and written respectively to multipliers 130–138 as the multiplicand. NRZ counter 170 is reset to the equivalent of binary zero, and in the above described manner, an output signal 174 evaluated for each of the possible Viterbi states in the next symbol instant. The corresponding branch metrics are evaluated and accumulated costs are updated then stored in traceback random access memory.

The NRZ counter increases its count by one and the convolution process is repeated, resulting in another output signal 174 that is an estimate of the received signal 176. The output signal 174 provides one input to a branch metric unit. The received signal 174 provides the other input to branch metric unit 182. Branch metrics are calculated for this estimate of the received signal and an add-compare-select function performed. Accumulated costs and traceback random access memory are updated. After the traceback random access memory is updated for several symbol instants, or after all symbol instants in a burst 100, a traceback operation determines a maximum likelihood sequence estimator symbol 188 for each symbol instant.

Upon completion of an update of the accumulated costs for each Viterbi state of a given symbol instant, flip-flop 24 again toggles and the modified tap weights stored in the registers of the other array of RAM112 are read, based on addresses generated by address generator 118 and concatenation circuit 120, then written respectively to multipliers 130–138 as the multiplicand. Estimates of the received signal in the next symbol instant are calculated. This process continues for each symbol instant represented by a burst 100.

In this manner, the status of the output of flip-flop 124 becomes a flag used to select the appropriate array of modified tap weights to use in the signal processing. Exploiting the midamble symbols in burst 100, the sequence of alternation of which array of modified tap weights to use in the convolution process, are detected by the synchronization circuit 126.

The eighth row of Table 1 shows the MLSE detected symbols 188 for the respective symbol instants output from Viterbi decoder 180. The MLSE decoded symbols 188 are multiplied with a counter-clockwise rotating vector 190 in multiplier 192. Counter-clockwise rotating vector 190 is shown on the ninth row of Table 1. An inverse NRZ 196 operation results in decoded symbols 198, shown on row eleven of Table 1.

Figure 4:
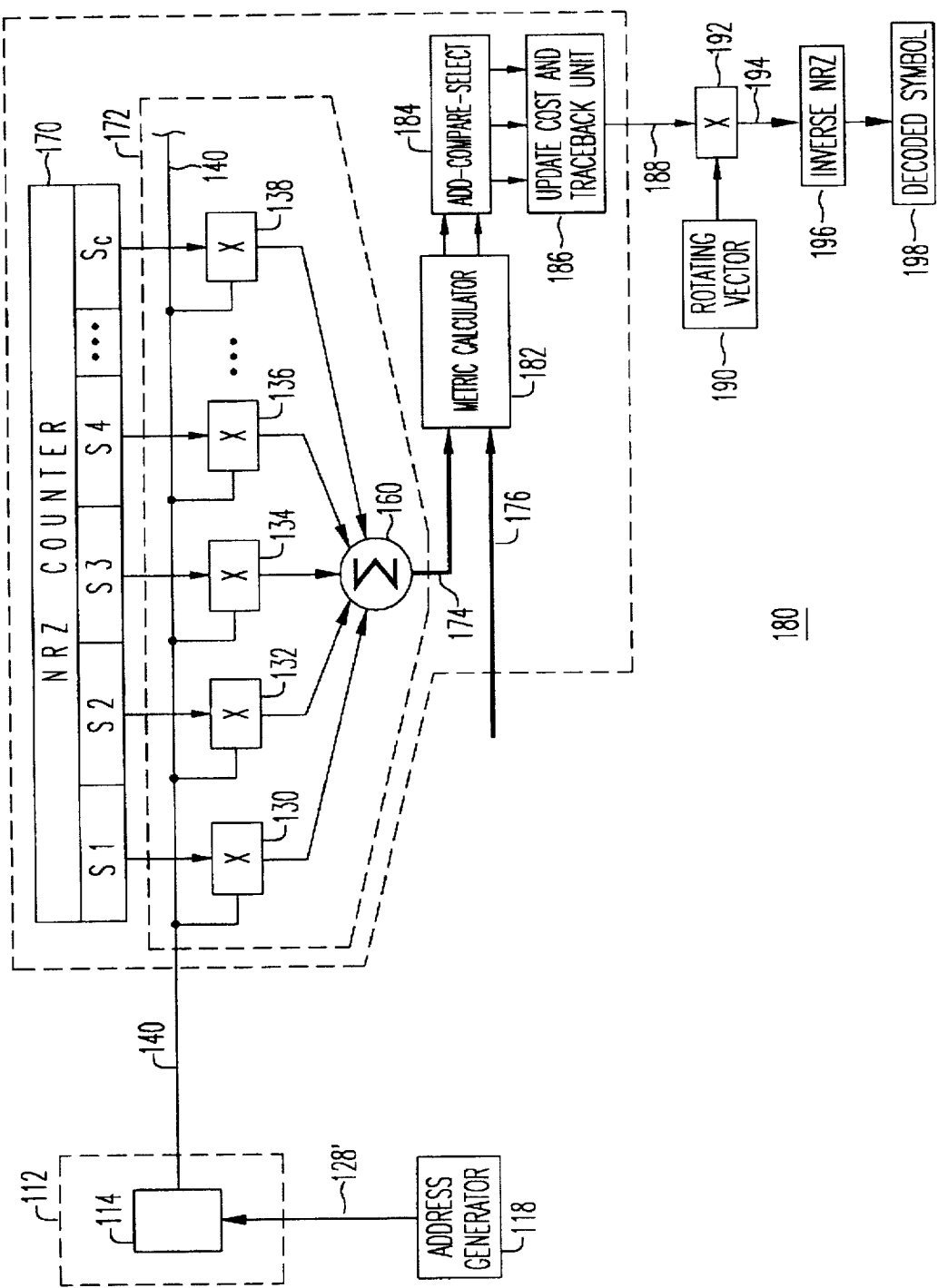
FIG. 4 is a simplified diagram similar to FIG. 3 of an alternate embodiment.

In an alternate embodiment shown in FIG. 4, after each update the modified tap weights required for operation of convolver 172 in the next symbol instant are computed and stored in registers of array 114. In this embodiment, control of which array from which to read the appropriate modified tap weights as introduced by toggle flip-flop 124 is not required. The modified tap weights are stored in the same array each update cycle. Synchronization circuit 126 still determines for each burst which phase component to initially multiply times the tap weights to produce the modified tap weights stored in array 114. Thereafter the phase alternates each occurrence of generating modified tap weights as shown in Tables 2 and 3.

In the FIG. 3 and 4 embodiments, the MLSE equalization occurred before derotation. In the embodiments shown in FIGS. 5 and 6, the derotation occurs before MLSE equalization.

Figure 5:
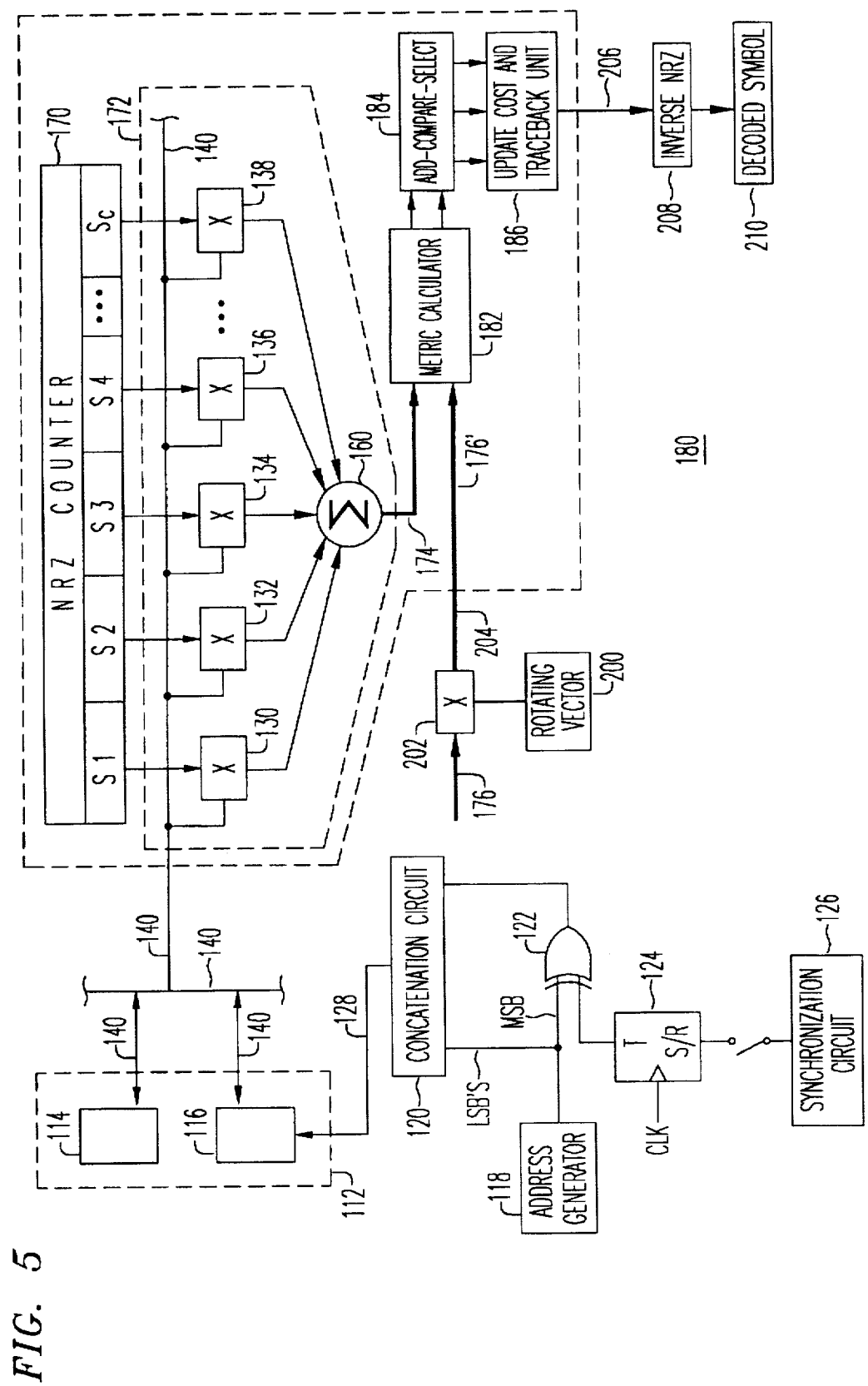
FIG. 5 is a simplified schematic diagram of another alternate embodiment.

FIG. 5 is a simplified schematic diagram of a portion of a receiver similar to FIG. 3 in which derotation occurs before MLSE equalization. Tap weights are stored in both arrays 114 and 116. The first tap weight, $h_0$, is stored in the first register of array 114 and also the first register of array 116. The second tap weight, $h_1$, is stored in the second register of array 114 and also the second register of array 116, and so forth. The tap weights are addressed and read from these arrays 114 and 116 to be the multiplier in multipliers 130 through 138, as described above with respect to the FIG. 3 embodiment. NRZ counter 170 and convolver 172 operate in the same manner as described with respect to the embodiment of FIG. 3 to generate convolver output signal 174.

Prior to received signal 176 being coupled as an input to the metric calculator 182, received signal 176 is multiplied by a clockwise rotating vector 200 in multiplier 202, in a process known as derotation. The derotated received signal 204 output from multiplier 202 is coupled as the second input to the metric calculator 182. Branch metrics are calculated for each estimate of the received signal, and an add-compare- selection function performed. Accumulated costs and traceback random access memory are updated. After the traceback random access memory is updated for several symbol instants, or after all symbol instants in a burst 100, a traceback operation determines a maximum likelihood sequence estimator equalizer symbol 206 for each symbol instant.

In the case of derotation before MLSE equalization, the MLSE detected symbols 206 are +1 or −1. The signals shown in rows 1 through 5 of Table 1 can be used to illustrate the exemplary embodiment of FIG. 5. The rotating vector, ideal output 206, and decoded symbols for each symbol instant are shown in Table 4 for the exemplary embodiment of FIG. 5. As shown in Table 4, the rotating vector, including the phase, is identical to the rotating vector shown in row 9 of Table 1. Note also that the decoded symbol a"(i) is identical to the decoded symbols from the MLSE after derotation, as shown on row 11 of Table 1.

TABLE 4

| $\theta=\exp[-j\pi(i+1)/2T]$ | −j | −1 | j | 1 | −j | −1 | j | 1 | −j | −1 | j | 1 | −j | −1 |
|---|---|---|---|---|---|---|---|---|---|---|---|---|---|---|
| ideal output = $\theta*\psi(t)$ | −1 | −1 | −1 | 1 | −1 | 1 | 1 | −1 | −1 | −1 | 1 | −1 | −1 | −1 |
| a"(i) | 0 | 0 | 0 | 1 | 0 | 1 | 1 | 0 | 0 | 0 | 1 | 0 | 0 | 0 |

Figure 6:
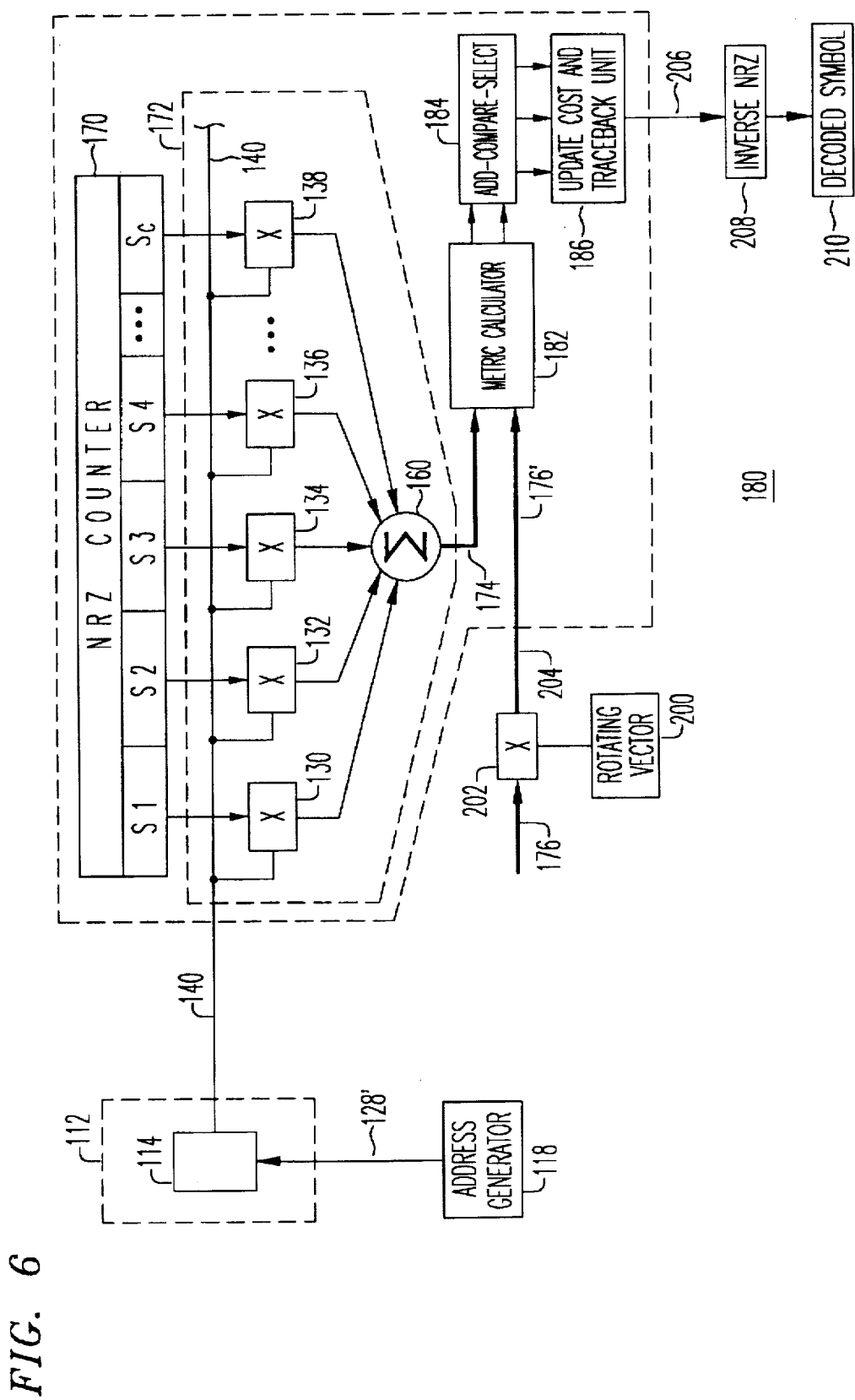
FIG. 6 is a simplified schematic diagram similar to FIG. 5 of yet another alternate embodiment.

In an alternate embodiment shown in FIG. 6, the redundant storage of tap weights is eliminated. After each update, the tap weights, if changed since the last update, are overwritten in array 114. In this embodiment, control over the array from which to read the appropriate tap weights as introduced by toggle flip-flop 124 is not required. The various signals produced in the exemplary embodiment of FIG. 6 are identical to the corresponding signals from the exemplary embodiment of FIG. 5.

The invention is particularly useful in communication systems and equipment employing integrated circuits including this technique. Such communications systems and equipment have the advantage of reduced complexity of circuitry to accomplish the signal processing. The receiver can be implemented employing a digital signal processor (DSP) with an embedded error correction coprocessor (ECCP). Tap weight calculations, factoring and calculation of the modified tap weights can be achieved in the DSP with the results passed to the ECCP.

While the illustrative embodiment of the invention has not been described as incorporating pipelining, one skilled in the art would recognize the enhanced computational efficiency available by utilizing pipelining in the design. Pipelining is achieved by initiating computation with a new data set before completing computations with a previous set of data. The more latches used in pipelining, the greater the depth of pipelining. Pipelining causes an initial latency in computation time required to fill the pipeline, but maximizes usage of resources such as adders and subtractors.

We claim:

1. An equalizer for a receiver operative to receive a signal comprised of a sequence of symbols transmitted to the receiver over a transmission channel by a transmitter, the impulse response function of the channel represented as tap weights, the equalizer for determining a maximum likelihood path representative of a sequence of symbols generated by the transmitter prior to transmission on the transmission channel, the equalizer comprising:

a storage array for storing modified tap weights, the modified tap weights being a product of the tap weights and a vector, the storage array comprising a first array of registers and a second array of registers, the first array of registers for storing a first set of said modified tap weights and the second array of registers for storing a second set of said modified tap weights a convolver for convolving the modified tap weights with possible states, the convolver having at least one multiplier receiving a modified tap weight as a multiplier and a bit of a possible state as a multiplicand, the at least one multiplier being an accumulator and providing the product of the modified tap weight and the bit of a possible state as a convolved output;

a metric calculator for receiving the convolved output and a received symbol from a sequence of received symbols, the metric calculator providing a branch metric;

an address generator for generating a first address of a register from which to read a modified tap weight, the first address including a most significant bit and least significant bits;

an exclusive OR having a first input, a second input and an output, the first input for receiving a signal capable of changing state, the second input for receiving the most significant bit of the first address produced by the address generator, the exclusive OR providing an output that is the exclusive OR of its two inputs; and a concatenation circuit for receiving the least significant bits of the first address from the address generator and the output from the exclusive OR, the concatenation circuit for combining the output from the exclusive OR with the least significant bits of the first address from the address generator to form a second address, whereby the second address formed by the concatenation circuit addresses a register in the first array of registers when the signal providing the first input to the exclusive OR is in a first state and the second address formed by the concatenation circuit addresses a register in the second array of registers when the signal providing the first input to the exclusive OR is in the second state.

2. An equalizer as recited in claim 1, further comprising a flip-flop providing an output, the output of the flip-flop coupled as the first input of the exclusive OR, whereby the state of the flip-flop output determines the state of the first input to the exclusive OR and hence which array of registers is addressed.

3. A receiver an equalizer operative to receive a signal comprised of a sequence of symbols transmitted to the receiver over a transmission channel by a transmitter, the impulse response function of the channel represented as tap weights, the equalizer for determining a maximum likelihood path representative of a sequence of symbols generated by the transmitter prior to transmission on the transmission channel, the receiver comprising:

means for receiving a sequence of symbols transmitted over a transmission channel;

means for factoring the sequence of symbols into a magnitude portion and a phase portion;

means for estimating tap weights representative of the impulse response function of the transmission channel;

means for generating modified tap weights by multiplying the repetitive phase portion of the tap weights by a vector;

a convolver for convolving the modified tap weights with bits of possible states, modified tap weights being a product of the tap weights and a rotating vector, the convolver having at least one multiplier, the at least one multiplier receiving a modified tap weight as a multiplier and a bit of a possible state as a multiplicand, the at least one multiplier being an accumulator and providing the product of the modified tap weight and the bit of a possible state as a convolved output;

a metric calculator for receiving the convolved output and a received symbol from the sequence of received symbols, the metric calculator providing a branch metric;

a storage array comprising a first array of registers and a second array of registers, the first array of registers for storing a first set of said modified tap weights and the second array of registers for storing a second set of said modified tap weights;

an address generator for generating a first address of a register from which to read a modified tap weight, the first address including a most significant bit and least significant bits;

an exclusive OR having a first input, a second input and an output, the first input for receiving a signal capable of changing state, the second input for receiving the most significant bit for the first address produced by the address generator, the exclusive OR providing an output that is the exclusive OR of its two inputs; and a concatenation circuit for receiving the least significant bits of the first address from the address generator and the output from the exclusive OR, the concatenation circuit for combining the output from the exclusive OR with the least significant bits of the first address from the address generator to form a second address, whereby the address formed by the concatenation circuit addresses a register in the first array of registers when the signal providing the first input to the exclusive OR is in a first state and the second address formed by the concatenation circuit addresses a register in the second array of registers when the signal providing the first input to the exclusive OR is in a second state.

4. A receiver as recited in claim 3, further comprising a flip-flop providing an output, the output of the flip-flop coupled as the first input of the exclusive OR, whereby the state of the flip-flop output determines the state of the first input to the exclusive OR and hence which array of registers is addressed.

5. A method of generating a detected symbol in a receiver operative to receive a signal transmitted by a transmitter to the receiver over a transmission channel, the detected symbol being the most likely symbol to have been transmitted of all possible symbols that could have been transmitted, the method comprising the steps of:

receiving a sequence of symbols transmitted over a transmission channel;

estimating tap weights representative of the impulse response function of the channel;

factoring the received sequence of symbols into a magnitude portion and a repetitive phase portion;

multiplying the tap weights representative of the channel by the repetitive phase portion to generate modified tap weights;

accumulating the modified tap weights in accordance with bits of a possible state to generate a possible transmitted symbol estimate, performing a maximum likelihood sequence estimation (MLSE) on a received symbol to identify a maximum likelihood transmitted symbol as the detected symbol;

multiplying a rotating vector by a received symbol from the sequence of received symbols to provide a derotated received symbol; and utilizing the derotated received symbol in performing a MLSE on a received symbol, whereby derotation is achieved before equalization.

6. A method as recited in claim 5, wherein accumulating in accordance with bits of a possible state means accumulating in accordance with the sign of a possible state.

7. A method of generating a detected symbol in a receiver operative to receive a signal transmitted by a transmitter to the receiver over a transmission channel, the detected symbol being the most likely symbol to have been transmitted of all possible symbols that could have been transmitted, the method comprising the steps of:

receiving a sequence of symbols transmitted over a transmission channel;

estimating tap weights representative of the impulse response function of the channel;

factoring the received sequence of symbols into a magnitude portion and a repetitive phase portion;

multiplying the tap weights representative of the channel by the repetitive phase portion to generate modified tap weights;

accumulating the modified tap weights in accordance with bits of a possible state to generate a possible transmitted symbol estimate;

performing a maximum likelihood sequence estimation (MLSE) on a received symbol to identify a maximum likelihood transmitted symbol as the detected symbol; and multiplying the MLSE detected symbol by a rotating vector, whereby derotation is achieved after equalization.

8. A method as recited in claim 7, wherein accumulating in accordance with bits of a possible state means accumulating in accordance with the sign of a possible state.

9. A receiver operative to receive a signal comprised of a sequence of symbols transmitted to the receiver over a transmission channel, a detected symbol being a most likely symbol to have been transmitted of all possible symbols that could have been transmitted, the receiver comprising:

means for receiving a sequence of symbols transmitted over a transmission channel;

means for estimating tap weights representative of the impulse response function of the channel;

means for factoring the received sequence of symbols into a magnitude portion and a repetitive phase portion;

means for multiplying the tap weights representative of the channel by the repetitive phase portion to generate modified tap weights;

means for accumulating the modified tap weights in accordance with bits of a possible state to generate a transmitted symbol estimate;

means for performing a maximum likelihood sequence estimation (MLSE) on a received symbol to identify a maximum likelihood transmitted symbol as the detected symbol;

means for multiplying a rotating vector by a received symbol from the sequence of received symbols to provide a derotated received symbol; and means for utilizing the derotated received symbol in performing a MLSE on a received symbol, whereby derotation is achieved before equalization.

10. A receiver as recited in claim 9, wherein the means for accumulating in accordance with bits of a possible state further comprises means for accumulating in accordance with the sign of a possible state.

11. A receiver operative to receive a signal comprised of a sequence of symbols transmitted to the receiver over a transmission channel, a detected symbol being a most likely symbol to have been transmitted of all possible symbols that could have been transmitted, the receiver comprising:

means for receiving a sequence of symbols transmitted over a transmission channel;

means for estimating tap weights representative of the impulse response function of the channel;

means for factoring the received sequence of symbols into a magnitude portion and a repetitive phase portion;

means for multiplying the tap weights representative of the channel by the repetitive phase portion to generate modified tap weights;

means for accumulating the modified tap weights in accordance with bits of a possible state to generate a transmitted symbol estimate;

means for performing a maximum likelihood sequence estimation (MLSE) on a received symbol to identify a maximum likelihood transmitted symbol as the detected symbol; and means for multiplying the MLSE detected symbol by a rotating vector whereby derotation is achieved after equalization.

12. A receiver as recited in claim 11, wherein the means for accumulating in accordance with bits of a possible state further comprises means for accumulating in accordance with the sign of a possible state.

13. A method of generating a detected symbol in a receiver operative to a receive a signal transmitted by a transmitter to the receiver over a transmission channel, the detected symbol being the most likely symbol to have been transmitted of all possible symbols that could have been transmitted, the method comprising the steps of:

receiving a sequence of symbols transmitted over a transmission channel;

estimating tap weights representative of the impulse response function of the channel;

factoring the received sequence of symbols into a magnitude portion and a repetitive phase portion;

multiplying the tap weights representative of the channel by the repetitive phase portion to generate modified tap weights;

convolving the modified tap weights with bits of a possible state to generate a possible transmitted symbol estimate;

performing a maximum likelihood sequence estimation (MLSE) on a received symbol to identify a maximum likelihood transmitted symbol as the detected symbol, wherein the bits of a possible state convolved with the modified tap weights include the bits of all possible states.

14. A receiver operative to receive a signal comprised of a sequence of symbols transmitted to the receiver over a transmission channel, a detected symbol being a most likely symbol to have been transmitted of all possible symbols that could have been transmitted, the receiver comprising:

means for receiving a sequence of symbols transmitted over a transmission channel;

means for estimating tap weights representative of the impulse response function of the channel;

means for factoring the received sequence of symbols into a magnitude portion and a repetitive phase portion;

means for multiplying the tap weights representative of the channel by the repetitive phase portion to generate modified tap weights;

means for convolving the modified tap weights with bits of a possible state to generate a transmitted symbol estimate; and means for performing a maximum likelihood sequence estimation (MLSE) on a received symbol to identify a maximum likelihood transmitted symbol as the detected symbol wherein the bits of possible states convolved with the modified tap weights include all of the possible states.

15. An equalizer for a receiver operative to receive a signal comprised of a sequence of symbols transmitted to the receiver over a transmission channel by a transmitter, the impulse response function of the channel represented as tap weights, the equalizer for determining a maximum likelihood path representative of a sequence of symbols generated by the transmitter prior to transmission on the transmission channel, the equalizer comprising:

a storage array for storing modified tap weights, the modified tap weights being a product of the tap weights and a vector;

a convolver for convolving modified tap weights with possible states, the convolver having at least one accumulator receiving a modified tap weight as a first input and a bit of a possible state as a scalar second input, the at least one accumulator providing the product of the modified tap weight and the bit of a possible state as a convolved output; and a metric calculator for receiving the convolved output and a received symbol from the sequence of received symbols, the metric calculator providing a branch metric.

16. An equalizer as recited in claim 15, wherein the vector is a repetitive vector.

17. An equalizer as recited in claim 15, wherein the second input is a non return-to-zero representation of a binary state.

18. A receiver comprising an equalizer operative to receive a signal comprised of a sequence of symbols transmitted to the receiver over a transmission channel by a transmitter, the impulse response function of the channel represented as tap weights, the equalizer for determining a maximum likelihood path representative of a sequence of symbols generated by the transmitter prior to transmission on the transmission channel, the receiver comprising:

means for receiving a sequence of symbols transmitted over a transmission channel;

means for factoring the sequence of symbols into a magnitude portion and a phase portion;

means for estimating tap weights representative of the impulse response function of the transmission channel;

means for generating modified tap weights by multiplying the phase portion of the tap weights by a vector;

a convolver for convolving the modified tap weights with bits of possible states, modified tap weights being a product of the tap weights and a rotating vector, the convolver having at least one accumulator, the at least one accumulator receiving a modified tap weight as a first input and a bit of a possible state as a scalar second input, the at least one accumulator providing the product of the modified tap weight and the bit of a possible state as a convolved output; and a metric calculator for receiving the convolved output and a received symbol from the sequence of received symbols, the metric calculator providing a branch metric.

19. A receiver as recited in claim 18, wherein the phase portion is repetitive.

20. A receiver as recited in claim 18, wherein the second input is a non return-to-zero representation of a binary state.

* * * * *